United States Patent

White-Hauser

Patent Number: 6,064,654
Date of Patent: May 16, 2000

[54] INTERNET FACSIMILE TIMING TECHNIQUE

[75] Inventor: Dale White-Hauser, San Jose, Calif.

[73] Assignee: Dialogic Corporation, Parsippany, N.J.

[21] Appl. No.: 08/878,187

[22] Filed: Jun. 18, 1997

[51] Int. Cl.[7] ................................................ G01R 31/08
[52] U.S. Cl. .................... 370/248; 370/231; 370/237; 370/238
[58] Field of Search .................................. 370/235, 236, 370/237, 238, 251, 425, 355, 389, 358, 231, 233, 420, 248, 250, 252; 379/100.01, 100.05, 100.12, 100.17

[56] References Cited

U.S. PATENT DOCUMENTS

| | | |
|---|---|---|
| 4,569,042 | 2/1986 | Larson ........................................ 370/13 |
| 5,233,604 | 8/1993 | Ahmadi et al. .............................. 370/60 |
| 5,381,408 | 1/1995 | Brent et al. ................................ 370/60 |
| 5,428,616 | 6/1995 | Field et al. ............................... 370/94.1 |
| 5,537,468 | 7/1996 | Hartmann ................................. 370/238 |
| 5,596,719 | 1/1997 | Ramakrishnan et al. ............... 370/238 |
| 5,608,721 | 3/1997 | Natarajan et al. ...................... 370/238 |
| 5,781,554 | 7/1998 | Organ ....................................... 370/474 |

Primary Examiner—Hassan Kizou
Assistant Examiner—Hanh Nguyen
Attorney, Agent, or Firm—Kaplan & Gilman, LLP

[57] ABSTRACT

An improved routing technique is disclosed whereby when a node becomes congested with data traffic, alternative nodes are utilized in order to maintain delays through the network to within acceptable limits. An originating node repetitively measures delays through numerous paths and causes packets to be routed through alternative paths as congestion occurs.

4 Claims, 3 Drawing Sheets

INTERNET FACSIMILE TIMING TECHNIQUE

TECHNICAL FIELD

This invention relates to facsimile transmission, and more specifically, to an improved technique of providing facsimile transmissions over data networks such as the Internet.

BACKGROUND OF THE INVENTION

Facsimile has become a widespread and ubiquitous technology over the past few years. Facsimile transmissions rely upon an image at one facsimile machine being translated into a sequence of tones, transmitted over the telephone network, and received by a receiving facsimile machine. The receiving facsimile machine then reconstructs the original image from the tones.

Of course, in order for the receiving and transmitting facsimile machines to properly work together, there must be a protocol agreed upon in advance. More specifically, the receiving facsimile machine must be aware of the encoding scheme used to convert the image into tones. Additionally, the receiving and transmitting facsimile machines must agree upon timing, maximum delays, etc.

There are a small number of worldwide standards that are used by facsimile machines in order to permit nearly any transmitting facsimile machine and any receiving facsimile machine to work together. Part of the protocol utilized by the facsimile machines involves timing the transmission of the tones correctly. The timing requirements however, are difficult to meet with facsimile systems which operate over data networks because the original protocols were designed to operate over a telephone network. The protocols therefore, are all designed with the presumption that there is a dedicated circuit connection between the transmitting and receiving facsimile machine.

The dedicated circuit introduces a relatively constant and extremely minimal transmission delay. The standardized facsimile protocols are therefore designed to operate within the worst case delay typically introduced by a dedicated circuit.

One such protocol which has gained widespread acceptance is termed the T.30 protocol. The T.30 protocol has been adapted by the International Telecommunications Unit, has been in widespread use for many years, and is implemented by nearly all facsimile machines in the world.

Recently, it has become more common to transmit facsimile images over data networks such as Local Area Networks (LANS) and Wide Area Networks (WANS). As transmission of facsimile images over data networks such as the Internet has become more prevalent, timing problems have become a major issue. For example, when facsimile images are transmitted over the Internet, variable and often unpredictable delays are introduced. The image to be transmitted is broken down into data packets which may arrive at different times and experience different delays as they are transmitted from node to node through the Internet. These variable and unpredictable delays often result in transmission timing which is outside the requirements of the facsimile protocol being implemented between the transmitting and receiving facsimile machine. As a result, the receiving facsimile machine may simply hang up, believing that there was a transmission error when in fact there was only a short delay.

One major reason for the timing problems which arise when transmitting facsimile images over the Internet is that the traffic load being handled by the various internet nodes varies in a dynamic and often unpredictable manner. Moreover, the routing tables utilized by the Internet do not vary, so that as a node becomes more heavily loaded, all communications involving that node slow down. The following example will help clarify.

Consider the arrangement shown in FIG. 2 comprising a plurality of Internet nodes 201 through 206. Each node 201–206 includes a routing table utilized to route data from the node to any other node. The routing tables are constructed based upon an established path between nodes. The established path is determined by a central location in accordance with well known techniques.

The routing table only instructs the node to route the data to the next node in the path. Thus, consider an established path from node 201 to node 204 through nodes 202 and 203. The routing table in node 201 provides that data destined for node 204 be transmitted to node 202. The routing table in node 202 provides that the data destined for node 204 be routed to node 203, and the routing table in node 203 then routes the data to node 204.

The problem arises when node 202, for example, begins to become heavily loaded with traffic, and thus packets traveling through node 202 experience large delays. The delay may be caused by other packets which are being routed, through node 202, between other nodes. The delays may fall outside of the restrictions of the T.30 protocol.

One prior art solution to the above problem is to provide storage facilities in the Internet service provider for transmitting the facsimile image utilizing a store and forward technique. Such an arrangement is shown in FIG. 1.

In operation, when it is desired to transmit a facsimile image from facsimile machine 101 to facsimile machine 102, the facsimile is first sent from facsimile machine 101 to facsimile storage device 105. The facsimile machine 101 can not distinguish between facsimile storage device 105 and a typical facsimile machine. Moreover, connection 110 is a standard telephone connection so that the communication between facsimile machine 101 and facsimile storage device 105, over connection 110, can operate in accordance with the standard facsimile protocols designed for a circuit switched connection.

After the image is stored at facsimile storage device 105, it is transmitted, via internet interfaces 106 and 107, over the Internet to facsimile storage device 108 using standard Internet protocols (e.g.; TCP\IP) which do not depend upon critical timing requirements set forth in the standard facsimile protocols. Next, the image is sent from facsimile storage device 108, to facsimile machine 102 via a standard facsimile connection over telephone line 111. The image may then be transferred in real time, in accordance with standard techniques, over telephone line 111.

The techniques set forth in FIG. 1 are acceptable but not ideal. One problem is that the facsimile image is not transmitted in real time. Specifically, when a user of the facsimile machine 101 is finished sending the facsimile, the user of facsimile machine 102 does not have it. Rather, the image is simply stored at facsimile storage device 105. For the image to be transmitted from Interface 106 to Interface 107, and then on to facsimile machine 102, may take several minutes or even hours. Thus, one of the main advantages of facsimile technology, the ability to have documents sent from one place to another instantly, is lost. As a result, the user of facsimile machine 101 can not be assured that the transmission is received at the other end just because he is finished sending it.

There exists a need in the art to provide a system for real time facsimile transmission over the Internet which solves the problem of the transmission delay introduced by the Internet causing delays that fall outside the scope of acceptable facsimile protocols.

SUMMARY OF THE INVENTION

The above and other problems of the prior art are overcome in accordance with the present invention which relates to a technique for measuring the transmission delay over a data network from a transmitting node to a receiving node and storing the delays for different paths through the network. As the delay changes for different paths as a result of network traffic, or other conditions, the path taken through the network is changed so that the delay through the network falls within acceptable protocol limits. Accordingly, both the transmitting and receiving facsimile machines can be connected to each other in real time.

DETAILED DESCRIPTION OF THE PREFERRED EMBODIMENT

Figure 1:
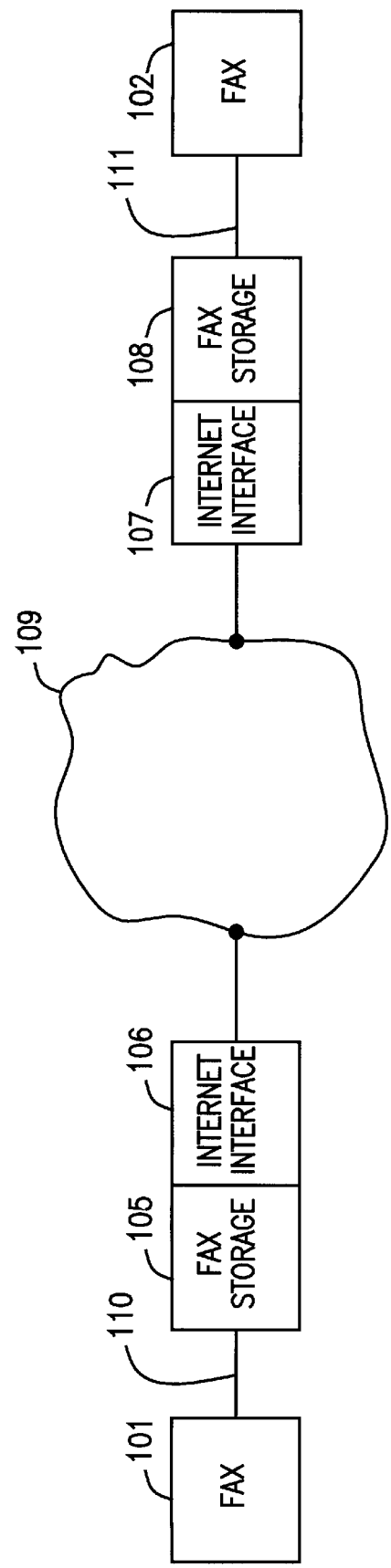
FIG. 1 shows a typical prior art arrangement for transmitting facsimile images over the Internet.

FIG. 1 shows a typical Internet facsimile system comprising facsimile machines 101 and 102, facsimile storage 105 and 108, and Internet interfaces 106 and 107. The Internet is shown conceptually as item 109 and includes numerous communications links and computers in accordance with the well known structure of the Internet.

Importantly, in the prior art system of FIG. 1, the facsimile is stored and is therefore not transmitted in real time. Thus, the delays introduced by the Internet do not cause a protocol time out because neither facsimile machine 101 nor facsimile machine 102 is transmitting or receiving any data during the time that the data is being sent over the Internet.

Figure 2:
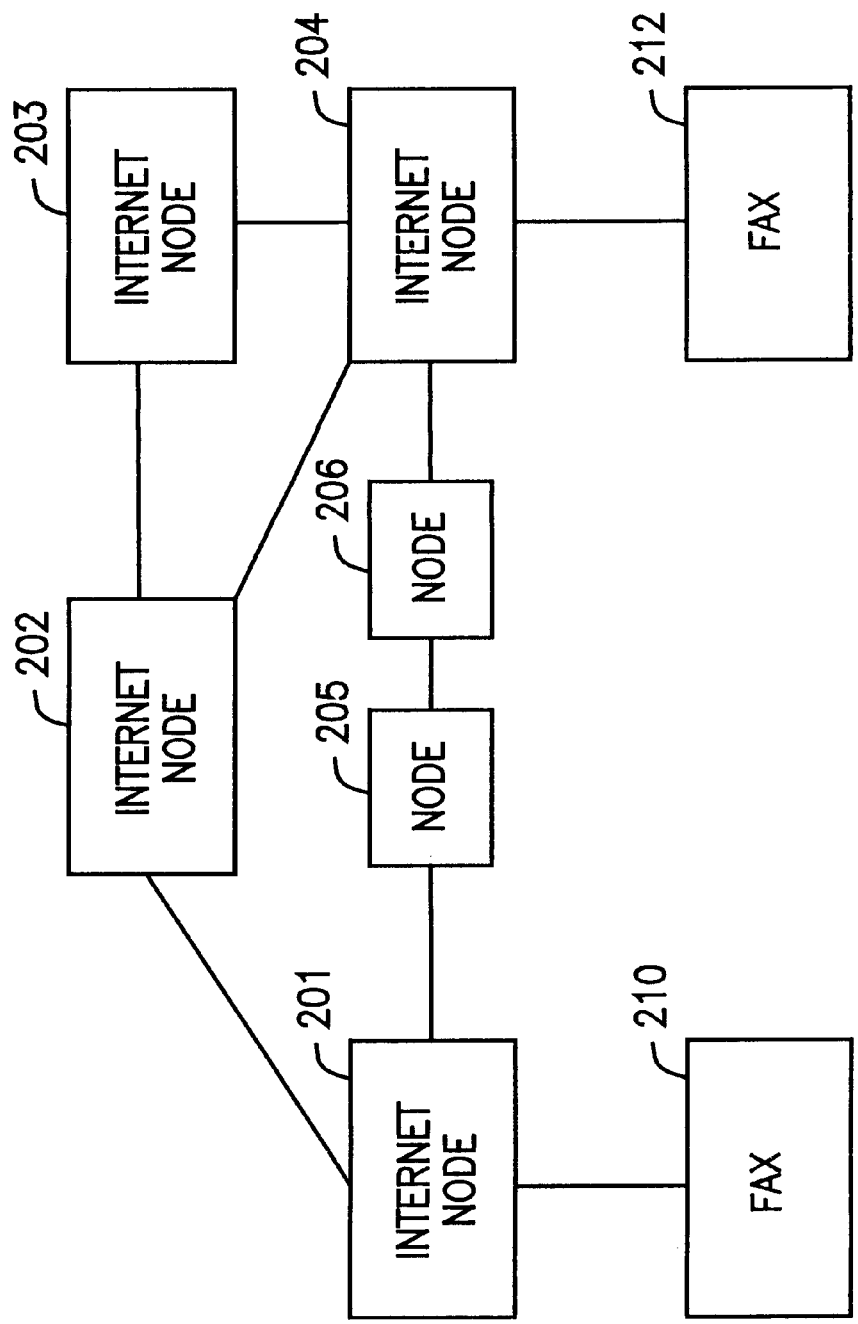
FIG. 2 shows a block diagram of facsimile machines connected to the Internet in a typical embodiment of the present invention.

Turning to FIG. 2, shown therein is a plurality of Internet service nodes 201 through 206. The nodes shown in FIG. 2 represent a very small portion of the total number of nodes in the Internet, which contains hundreds of thousands of such nodes. Each node contains a routing table which determines the destination node for a packet and routes the packet accordingly. The technique for extracting the address of the destination node and routing the packet is well known to those of skill in the art. The standard routing tables used by the nodes are periodically updated in accordance with known techniques.

In operation of the inventive system, the standard routing tables initially, for example, provide that information to be sent from facsimile machine 210 to facsimile machine 212 are routed through Internet servers 201, 202, and 204. This represents the least number of hops required in order to send the information through the Internet. More specifically, only three nodes are required to be involved, as opposed to the four nodes which would be required if the data were routed from 201 to 204 through nodes 205 and 206. Accordingly, the routing tables present in the nodes will typically provide that the data is to be sent through Internet nodes 201, 202, and 204.

In accordance with the present invention, Internet node 201 is programmed, in accordance with an algorithm to be further defined later herein, such that its default path for routing data to node 204 is as described above but that two other alternative paths exist. If Internet node 201 determines that the delay being experienced by data traveling to Internet node 204 is getting too close to the threshold which is acceptable for the T.30 protocol, Internet node 201 may utilize an alternate path and route the data to node 205 instead.

The node 205 routing tables indicate that data for node 204 is to be routed to node 206, and node 206 sends the data to node 204. As can be appreciated, the imminent overload condition which would cause the T.30 protocol to no longer operate correctly is avoided as long as the second path is slightly less crowded. It can also be appreciated that there can be multiple paths in addition to the two discussed.

Another alternative path would be from node 201 through nodes 202 and 203 to node 204. This second alternative path presents a slightly different problem because, as previously described, the routing tables of Internet service provider 201 only "know" to send the information to Internet service provider 202. The routing table present in node 201 does not have knowledge or control over what happens after the packet is sent to node 202. Whether Internet service provider 202 sends the information through node 203 or directly to node 204 is a function of the routing tables of node 202. Thus, if node 201 is measuring the delay of packets through the network, and decides to change from the path 201, 202, 204 to the path 201, 202, 203, 204, there must exist a technique for node 201 to cause the routing tables of node 202 to be changed.

Several techniques for doing so exist. One such technique would be to have node 201 simply signal node 202 with a separate packet, perhaps out of band, to simply update the node 202 routing tables, and causes them to now send things destined for node 204 directly to node 204. However, if the delay being experienced by node 201 is caused by node 202 itself being busy, then this rerouting will not help. Accordingly, the best solution is to have the alternative paths comprise completely different sets of nodes, with the exception of the starting and ending nodes 201 and 204, which are connected to the facsimile machines communicating, and thus cannot be changed.

If either node 201 or 204 becomes so heavily loaded that timing considerations become problematic, then a timeout may result. However, the chance of the timeout problem occurring in either node 201 or node 204 is much less than the chance of a timeout occurring in any node throughout the path taken by a packet traveling from node 201 to node 204.

Figure 3:
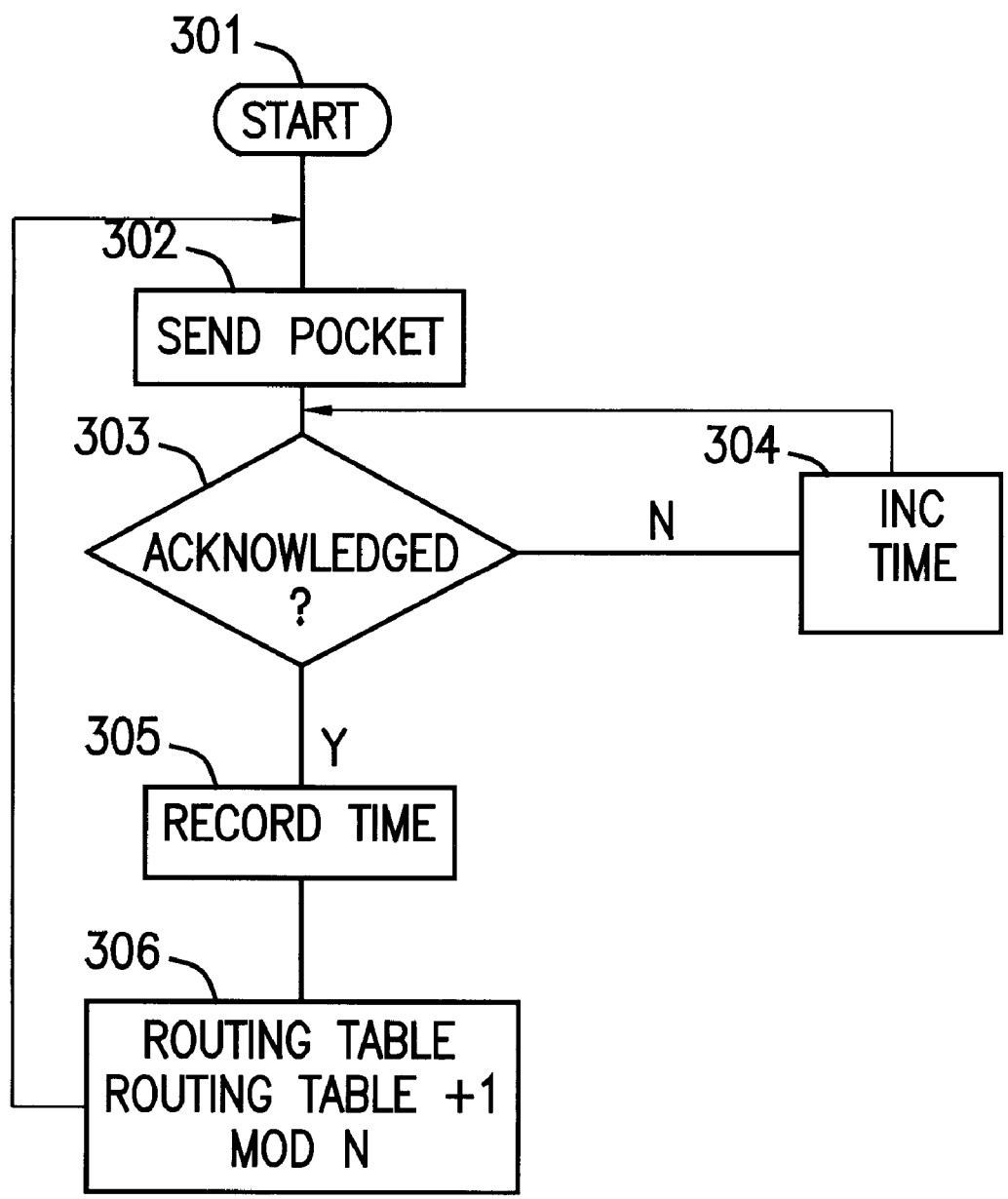
FIG. 3 shows a flow chart of an algorithm which may be implemented at an Internet node in order to employ the techniques of the present invention.

FIG. 3 shows a basic flow chart of an algorithm for use at node 201 in measuring delay. The algorithm is entered at block 301 and a packet is sent at block 302 through the networks default path to node 204. Decision point 303 continually checks to determine if the packet was acknowledged, and increments a timer as long as such packet is not so acknowledged. Once the packet is acknowledged, the round trip delay time is now known.

The round trip delay time is recorded at block 305 and block 306 increments a counter in order to move to the next possible path to be used for routing through the network. The process of sending the packet through the next path and measuring its delay time is then repeated. Operational block 306 is, due to the mod N, continually checking all of the paths 1–N, and then starting again with path 1.

Accordingly, it can be appreciated from the above that there is a continual or at least relatively frequent updating of the delay time through the network for each of a plurality of paths. Specifically, the flow chart set forth in FIG. 3 describes a system whereby if there are, for example, five possible alternative paths through the network from a particular node to a different node, there will exist a routing table with a set of five values, each of which represents the delay through the network to various alternative paths. As the primary path becomes congested, the secondary paths can be used.

Additionally, the routing table in each node can be updated from the central location in accordance with the standard techniques utilized to set routing tables in the present day art. Thus, when it is desirable to update the routing tables, an alternative technique is to have the Internet service provider 201 signal the central location which updates the routing tables, and have new routing tables sent to the various nodes to change the path of the message traveling between Internet nodes.

The delays involved in utilizing the central location could, in some limited circumstances, result in the T.30 protocol timing out prior to the routing path being changed. For this reason, the technique of changing the routing path without involving any central location may be desirable.

What is claimed is:

1. A system for routing facsimile images over a data network, said system comprising:

a plurality of network nodes, each node including information sufficient to determine, from examining a data packet, a subsequent node to which a data packet should be routed;

means for monitoring at predetermined intervals (i) time required for a packet to traverse said network from a first node to a second node over a first path, and (ii) time required for packets to traverse said network over a second path;

means for periodically transmitting a test packet from said first node to said second node;

means for measuring delay experienced by the test packet in traveling from said first node to said second node over a plurality of different paths; and means for maintaining a list of said delays.

2. A system according to claim 1 further comprising means at each network node for maintaining routing tables and for signaling a subsequent node in said first path to change routing tables when said delay reaches a predetermined level.

3. A method of transmitting facsimile messages through a data network comprising the steps of;

maintaining a table indicative of various paths through the data network;

monitoring at predetermined intervals (i) time required for a packet to traverse said network from a first node to a second node over a first path, and (ii) time required for packets to traverse said network over a second path;

periodically transmitting a test packet from said first node to said second node;

measuring delay experienced by the test packet in traveling from said first node to said second node over a plurality of different paths;

utilizing a first path through the data network as a default path; and utilizing any one of a plurality of other paths through said data network so long as such other data path meets particular timing requirements and when said default path meets particular timing requirements and when said default path is within a predetermined range of said timing requirements.

4. The method of claim 3 further comprising the step of updating routing tables in different nodes in the network when delays through the network reach a predetermined limit.

* * * * *